US009726088B2

(12) United States Patent
Kuang et al.

(10) Patent No.: US 9,726,088 B2
(45) Date of Patent: Aug. 8, 2017

(54) SYSTEM AND METHOD FOR OBTAINING AN ADJUSTABLE ACCELERATOR PEDAL RESPONSE IN A VEHICLE POWERTRAIN

(75) Inventors: Ming Lang Kuang, Canton, MI (US); Fazal Urrahman Syed, Canton, MI (US); Anthony Mark Phillips, Northville, MI (US); Deepa Ramaswamy, Canton, MI (US); Brandon R. Masterson, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3078 days.

(21) Appl. No.: 11/928,055

(22) Filed: Oct. 30, 2007

(65) Prior Publication Data

US 2009/0112439 A1 Apr. 30, 2009

(51) Int. Cl.
| F02D 11/10 | (2006.01) |
| B60W 30/188 | (2012.01) |
| B60K 6/448 | (2007.10) |
| B60K 6/48 | (2007.10) |
| F02D 29/02 | (2006.01) |

(52) U.S. Cl.
CPC ......... *F02D 11/105* (2013.01); *B60W 30/188* (2013.01); *B60K 6/448* (2013.01); *B60K 6/48* (2013.01); *B60W 2520/10* (2013.01); *B60W 2540/10* (2013.01); *B60W 2710/105* (2013.01); *F02D 29/02* (2013.01); *F02D 2250/18* (2013.01); *Y02T 10/6221* (2013.01); *Y02T 10/6243* (2013.01)

(58) Field of Classification Search
CPC ............................ F02D 11/105; B60W 30/188

USPC ................... 701/99, 49, 70, 36, 84, 90, 110
See application file for complete search history.

(56) References Cited

U.S. PATENT DOCUMENTS

| 2,692,980 A | 10/1954 | Platt |
| 2,825,418 A | 3/1958 | Kershman |
| 4,019,475 A | 4/1977 | Nuss |
| 4,385,604 A | 5/1983 | Fiala |
| 5,080,207 A | 1/1992 | Horneffer |
| 5,113,721 A | 5/1992 | Polly et al. |
| 5,166,879 A | 11/1992 | Greene et al. |

(Continued)

FOREIGN PATENT DOCUMENTS

| CN | 1671578 | 9/2005 |
| DE | 10218012 A1 | 11/2003 |

(Continued)

OTHER PUBLICATIONS

GB Search Report for Application GB0819741.0 dated Jan. 26, 2009.

(Continued)

*Primary Examiner* — Thomas G Black
*Assistant Examiner* — Peter D Nolan
(74) *Attorney, Agent, or Firm* — David Kelley; Brooks Kushman P.C.

(57) ABSTRACT

The disclosed system and method changes a traction torque request in a vehicle powertrain with a driver-controlled vehicle accelerator pedal. A desired transfer function parameter in a powertrain control module is chosen by the driver to obtain a desired functional relationship between a traction torque request or a power plant torque request and accelerator pedal position.

17 Claims, 2 Drawing Sheets

(56) References Cited

U.S. PATENT DOCUMENTS

| | | | |
|---|---|---|---|
| 5,378,052 A | | 1/1995 | Yoshino |
| 5,508,923 A | * | 4/1996 | Ibamoto et al. ............... 701/70 |
| 5,627,752 A | | 5/1997 | Buck et al. |
| 5,693,876 A | | 12/1997 | Ghitea et al. |
| 5,897,437 A | | 4/1999 | Nishiumi et al. |
| 6,044,318 A | * | 3/2000 | Bourdon et al. ............... 701/65 |
| 6,085,725 A | | 7/2000 | Goode et al. |
| 6,092,021 A | | 7/2000 | Ehlbeck et al. |
| 6,188,945 B1 | | 2/2001 | Graf et al. |
| 6,289,332 B2 | | 9/2001 | Menig et al. |
| 6,295,500 B1 | | 9/2001 | Cullen et al. |
| 6,298,745 B1 | | 10/2001 | Rixon et al. |
| 6,309,031 B1 | | 10/2001 | Crombez et al. |
| 6,366,848 B1 | | 4/2002 | Gustavsson |
| 6,377,884 B1 | | 4/2002 | Loeffler et al. |
| 6,389,347 B1 | * | 5/2002 | Nozaki ............... 701/54 |
| 6,470,256 B1 | | 10/2002 | Cikalo et al. |
| 6,487,477 B1 | | 11/2002 | Woestman et al. |
| 6,507,782 B1 | | 1/2003 | Rumbo et al. |
| 6,580,417 B2 | | 6/2003 | Rosenberg et al. |
| 6,655,199 B1 | | 12/2003 | Smith |
| 6,658,327 B1 | * | 12/2003 | Reppich et al. ............... 701/1 |
| 6,693,622 B1 | | 2/2004 | Shahoian et al. |
| 6,708,099 B2 | | 3/2004 | Tellis et al. |
| 6,739,212 B2 | | 5/2004 | Flynn |
| 6,751,544 B2 | | 6/2004 | Hashimoto et al. |
| 6,882,915 B2 | | 4/2005 | Yamamura et al. |
| 6,904,823 B2 | | 6/2005 | Levin et al. |
| 6,907,325 B1 | | 6/2005 | Syed et al. |
| 6,925,425 B2 | | 8/2005 | Remboski et al. |
| 6,994,360 B2 | | 2/2006 | Kuang et al. |
| 7,006,917 B2 | | 2/2006 | Hijikata |
| 7,013,213 B2 | | 3/2006 | McGee et al. |
| 7,162,349 B2 | | 1/2007 | Hijikata et al. |
| 7,305,300 B2 | | 12/2007 | Gibson et al. |
| 7,403,842 B2 | | 7/2008 | Yamamura et al. |
| 7,499,787 B2 | * | 3/2009 | Hrovat et al. ............... 701/82 |
| 7,646,289 B2 | | 1/2010 | Tamai et al. |
| 2001/0030658 A1 | | 10/2001 | Rosenberg et al. |
| 2001/0039230 A1 | | 11/2001 | Severinsky et al. |
| 2002/0095247 A1 | | 7/2002 | Ding et al. |
| 2002/0116156 A1 | | 8/2002 | Remboski et al. |
| 2002/0171541 A1 | | 11/2002 | Crombez et al. |
| 2003/0168266 A1 | | 9/2003 | Sasaki et al. |
| 2003/0188594 A1 | | 10/2003 | Levin et al. |
| 2003/0191573 A1 | | 10/2003 | Beyer et al. |
| 2004/0249533 A1 | | 12/2004 | Wheals et al. |
| 2005/0021226 A1 | | 1/2005 | Kustosch |
| 2005/0110348 A1 | | 5/2005 | Hijikata et al. |
| 2005/0256632 A1 | | 11/2005 | McGee et al. |
| 2006/0109098 A1 | | 5/2006 | Grill et al. |
| 2006/0181409 A1 | | 8/2006 | Yamamoto et al. |
| 2007/0085667 A1 | | 4/2007 | Cicilloni et al. |
| 2007/0244619 A1 | * | 10/2007 | Peterson ............... 701/70 |
| 2007/0271026 A1 | | 11/2007 | Hijikata |
| 2007/0276549 A1 | * | 11/2007 | Hijikata ............... 701/1 |
| 2007/0276582 A1 | | 11/2007 | Coughlin |
| 2008/0015767 A1 | | 1/2008 | Masuda et al. |
| 2008/0015768 A1 | * | 1/2008 | Masuda et al. ............... 701/99 |
| 2008/0042489 A1 | | 2/2008 | Lewis et al. |
| 2009/0112439 A1 | * | 4/2009 | Kuang et al. ............... 701/99 |
| 2009/0132141 A1 | * | 5/2009 | Hrovat et al. ............... 701/87 |

FOREIGN PATENT DOCUMENTS

| | | |
|---|---|---|
| FR | 2828155 | 2/2003 |
| JP | 2003-120339 | 4/2003 |
| JP | 2003335151 | 11/2003 |
| JP | 2004-314871 | 11/2004 |
| JP | 2005-132225 | 5/2005 |
| JP | 2006-316629 | 11/2006 |
| JP | 2007-076468 | 3/2007 |
| JP | 2007-182196 | 7/2007 |
| WO | 2004087484 | 10/2004 |

OTHER PUBLICATIONS

Nissan ECO pedal technology to increase fuel efficiency by 5-10 percent, Aug. 4, 2008, Zach Gale, Motor Trend, Automotive News.
Continental produces the first accelerator pedal that communicates with the driver, Frankfurt am Main, Germany, Aug. 11, 2008, Press release for the trade press.
Extended European Search Report for EP 07 81 1931.0 dated Oct. 4, 2010.
The State Intellectual Property Office of P.R. China, English translation of the First Office Action and Text of the First Office Action issued Mar. 1, 2010 for the corresponding Chinese Patent Application No. 200780017580.3.
Ming & Sure Intellectual Property Law Firm, the first Office Action in Chinese for Chinese Patent Application No. 200780017580.3 mailed Mar. 1, 2010.
1975 AMC Pacer Home Page, pp. 1-16.
Driving Skills for Life—Eco-Driving, www.drivingskillsforlife.com.
Top Tips for Fuel Efficient Driving, www.shell.com, pp. 1-3.
Driving Tips, We Test the Tips, What Really Saves Gas? nd How Much? www.edmunds.com, pp. 1-5.
New Scientist & Peregrine, Vibrating Pedal says "Ease Off Gas", www.newscientist.com, pp. 1-3.
obd2allinone.com, Low Cost OBD2 All-In-One Scan Tools, pp. 1-10.
Volkswagen of America, Electronics Research Lab—Symbiotic Car: Haptic Feedback Accelerator Pedal.
G. Reichart et al., Potentials of BMW Driver Assistance to Improve Fuel Economy, pp. 1-16.
Drivers, Beware So-Called Gas Aid Gadgets, detnews.com, pp. 1-2.
FTC Facts for Consumers "Gas Saving" Products: Fact or Fuelishness?, Sep. 2006.

* cited by examiner

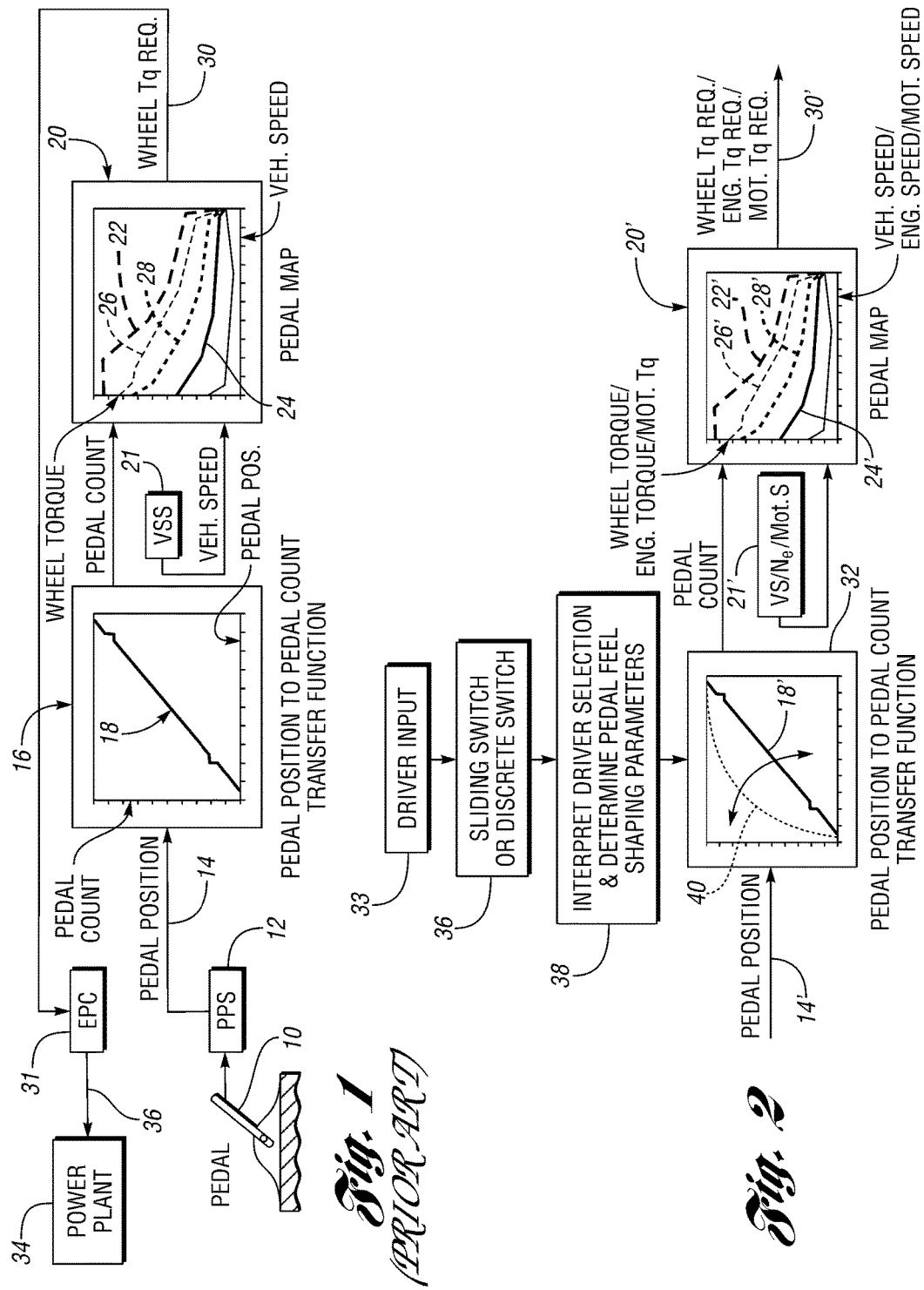

SYSTEM AND METHOD FOR OBTAINING AN ADJUSTABLE ACCELERATOR PEDAL RESPONSE IN A VEHICLE POWERTRAIN

BACKGROUND OF THE INVENTION

1. Field of the Invention

The invention relates to a so-called "drive-by wire" control in an automotive vehicle powertrain.

2. Background Art

In a typical automotive vehicle powered by a power plant such as an internal combustion engine, an engine throttle may be adjusted by a vehicle operator using an accelerator pedal, a throttle actuator, such as an electric stepper motor, and an accelerator pedal position sensor that detects accelerator pedal position determined by the driver. Pedal position sensor output may be converted to a pedal position percentage analog signal or to a so-called pedal count using a pre-calibrated transfer function. A pedal count is defined as the number of electrical voltage pulses that are transmitted to the stepper motor for a given accelerator pedal displacement. Other power plants, such as an electric motor or a hydrogen fuel cell and electric motor system, also could be used in a vehicle powertrain rather than an internal combustion engine. In each case, a driver-controlled pedal, or its equivalent, is used to develop an indicator of driver demand for power.

An electronic controller for developing a wheel torque request includes a memory in which a pedal map resides. The pedal map is calibrated so that for a given pedal count or other pedal position signal and a given vehicle speed, a wheel torque request is issued to an electronic power plant controller.

SUMMARY OF AN EMBODIMENT OF THE INVENTION

An embodiment of the invention makes it possible to change a functional relationship between a driver-controlled pedal position value and a vehicle wheel torque request so that the response of an electronic controller for a power plant (engine, electric motor, fuel cell) to a given pedal position change can be varied as desired by the driver. The driver thus can be provided with a selected haptic pedal feel. For example, if the driver desires a so-called "sport car feel", the disclosed embodiment of the invention will make provision for adjusting the response of the power plant controller to a given pedal position change.

One embodiment of the invention comprises a system and method wherein a driver-operated switch will interpret a driver's desire for a selected pedal feel. The switch output will shape a transfer function for a pedal position and pedal position signal relationship. The switch may be a switch with discrete outputs that permits the driver to obtain defined shaping parameters for a pedal position to pedal count transfer function. It also may be a sliding, variable output switch that permits the driver to obtain any shaping parameter in a range of shaping parameter values. Further, the switch may be replaced by adapting a known navigation system or information system with a visual display that permits driver interaction with a transfer function algorithm.

Multiple shaping parameters for the transfer function can be provided so that the transfer function will convert pedal positions to pedal position signals of various magnitude. A pedal map stored in the electronic controller memory includes multiple pre-calibrated relationships between wheel torque and vehicle speed. The pedal position signal for a given pedal displacement determined by a shaping parameter for the transfer function is used, for a given vehicle speed, to develop a wheel torque request output at the pedal map. In an alternative embodiment of the invention, an engine speed signal, or a motor speed signal, rather than a vehicle speed signal, can be used as an input variable for the pedal map. Further, an engine torque request or a motor torque request can be developed as an output signal from the pedal map rather than a wheel torque request. In either case, the output signal from the pedal map is used by the electronic power plant controller to command a powertrain response.

BRIEF DESCRIPTION OF THE DRAWINGS

FIG. 1 is a schematic diagram of a conventional vehicle powertrain (non-hybrid) that includes an internal combustion engine with an accelerator pedal wherein a wheel torque request, in response to a pedal position signal, is developed in a known fashion;

FIG. 2 is a diagrammatic representation of a control system for the powertrain of FIG. 1 for developing a wheel torque request in response to a pedal position signal, wherein provision is made for changing a transfer function used in development of a pedal count for determining a wheel torque request, an engine torque or a motor torque request;

PARTICULAR DESCRIPTION OF AN EMBODIMENT OF THE INVENTION

Figure 3:
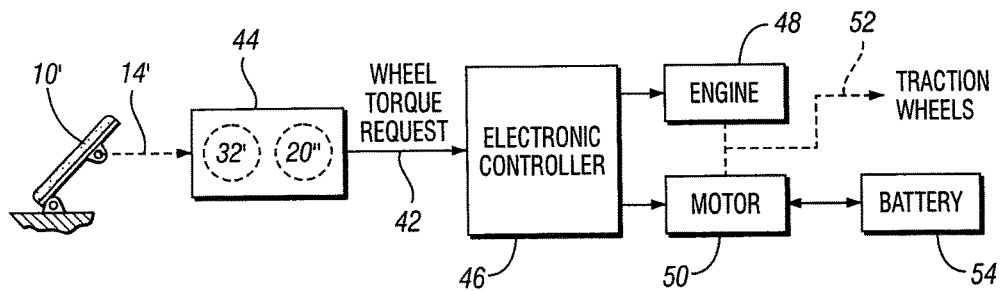
FIG. 3 is a view of a control system, similar to the control system of FIG. 2, which is adapted for use in a parallel-hybrid electric vehicle powertrain.

The system and method of the invention can be used for changing a response to an accelerator pedal adjustment for a vehicle powertrain having an engine with a so-called drive-by-wire throttle. The invention can be adapted for use with conventional vehicles having an internal combustion engine only as well as hybrid electric vehicles, wherein mechanical internal combustion engine power is complemented by electric motor power.

FIG. 1 shows schematically a known system for a conventional (non-hybrid) powertrain for obtaining a wheel torque request in response to accelerator pedal movement. In the case of the system of FIG. 1, an accelerator pedal 10 develops a pedal position signal using a pedal position sensor 12. A pedal position signal 14 is received by control block 16, which represents controller memory registers that contain a pedal position to pedal count transfer function 18, which usually is generally linear as shown. The output of block 16 could also be an analog signal indicating percentage of pedal displacement. The output information for block 16 is transferred to controller memory registers that contain a pedal map 20. Inputs to pedal map 20 are vehicle speed and pedal position or pedal count. Vehicle speed used in pedal map 20 is monitored by vehicle speed sensor 21.

Multiple wheel torque and vehicle speed relationships are plotted in the pedal map. The plot 22 represents a 100% pedal position. The plot shown at 24 represents a pedal position of zero. Plots intermediate the maximum and minimum plotted values are shown at 26 and 28. For every pedal count and vehicle speed, there will be a corresponding wheel torque request (command) output, as shown at 30. The wheel torque request is distributed to an electronic power plant controller (EPC) shown at 31. In the case of FIG. 1, the power plant may be an engine 34. The engine 34 responds to the wheel torque request by issuing a torque command to the engine, as shown at 35, for adjusting the throttle for the engine. If the power plant is an electric motor, a motor torque command is issued to the motor.

For values of vehicle speed and wheel torque represented by a point not located on one of the plots shown in FIG. 1 in the pedal map 20, a wheel torque request can be obtained using a simple interpolation technique.

FIG. 2 is a schematic diagram of a control system for a vehicle engine throttle control system that includes features of the present embodiment of the invention. Some of the elements illustrated in FIG. 1 are common to the schematic diagram of FIG. 2. They have been identified by the same reference numerals, although prime notations are added to the numerals of FIG. 2.

FIG. 2 includes a pedal position to pedal count transfer function plot at 32. It shows a relationship between accelerator pedal position 14 and pedal count. A driver input at 33 actuates a sliding switch, or a discrete switch, shown at 36, whereby the driver can select a desired transfer function shape at plot 32. As previously explained, the switch can be replaced by adapting a known navigation system or information system with a driver interface that includes a display screen. If the driver wishes to use a high performance powertrain characteristic, a high performance transfer function can be selected using the input from the switch at 36. The particular plot of the transfer function that is chosen depends upon shaping parameters for the transfer function, which are pre-calibrated values stored in memory. Each value can be accessed by appropriately positioning the sliding switch (variable output switch) or by activating the discrete switch at 36.

For a given displacement of the accelerator pedal, the driver selection is interpreted at 38, and a parameter is selected to obtain an appropriate transfer function at 40, which is modified compared to the function 18' corresponding to function 18 in FIG. 1. Thus, the system shown in FIG. 2 will provide the driver with an opportunity to select a pedal feel by choosing a pre-calibrated shaping parameter at 40 in developing a wheel torque request.

Maximum and minimum pedal count plots are included in pedal map 20', as well as intermediate pedal count plots. If a given pedal count determined at 32 is not located on one of the plots in the pedal map 20', a wheel torque request 30', as previously described with reference to FIG. 1, can be determined by interpolation.

Although a pedal count is illustrated in FIG. 2 as an indicator of pedal position, other kinds of variables, such as an analog pedal position signal, could be used.

The pedal count or other pedal position information is an input to the pedal map 20'. A second input is a vehicle speed signal, as shown at 21'. The input also could be engine speed or motor speed. The pedal map, using the input speed information, will develop either a wheel torque request, an engine torque request or a motor torque request. The pedal map is stored in memory of a system controller, of which controller 31 is a part. Included in the memory is a calibrated relationship between engine speed and engine torque, which are the characteristic variables that would be included in the pedal map at 20' if the feedback variable for controller 31 were an engine torque request rather than a wheel torque request. If the power plant is a motor, the feedback variable would be a motor torque request. In that case, the characteristic variables would be motor speed and motor torque request (MOT.Tq REQ).

A second embodiment of the invention is shown in FIG. 3. This embodiment is a parallel-series hybrid electric vehicle powertrain in which motive power is obtained from an engine as well as an electric motor. Power demand by the driver of a vehicle with the powertrain illustrated in FIG. 3 is obtained by adjusting a pedal shown at 10'. The adjustment of the pedal is sensed by a pedal position sensor to develop a pedal position signal 14'. A wheel torque request is obtained from a control module 44 that contains a pedal position to a pedal count transfer function plot 32' and a pedal map 20", which correspond to the plot 32 and pedal map 20' seen at FIG. 2.

The wheel torque request at 42 is received by an electronic controller 46, which corresponds to the controller shown at 31 in FIG. 1. Unlike the controller 31 of FIG. 1, the controller 46 controls engine power as well as motor power for engine 48 and motor 50. Both engine power and motor power are delivered to the vehicle traction wheels, as shown at 52. Battery 54 is electrically coupled to motor 50 for powering the motor when the motor delivers power to the traction wheels. Regenerative energy can be captured by the motor so that the motor acts as a generator to charge the battery 54. When the battery state-of-charge is low, a portion of the engine power can be used to drive the motor so that the motor acts as a generator to charge the battery.

Figure 4:
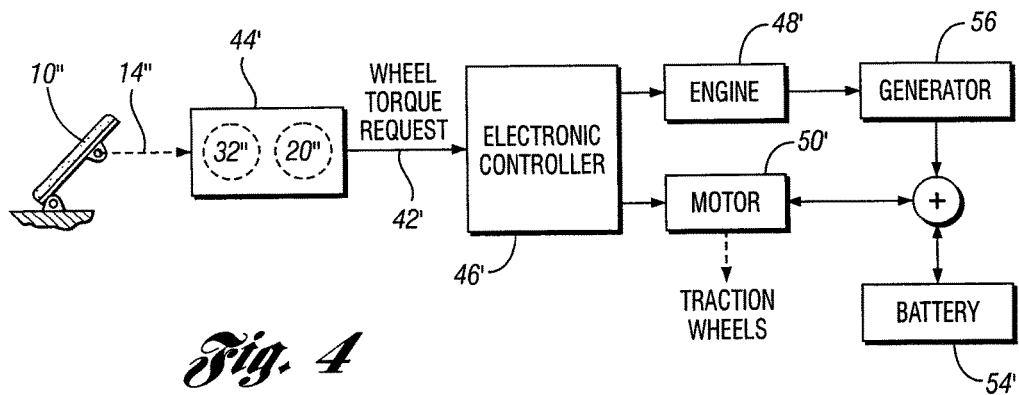
FIG. 4 is a view, similar to FIG. 2, which is adapted for use in a series-hybrid electric vehicle powertrain.

FIG. 4 is an example of a series-hybrid electric vehicle powertrain that may embody the features of the present invention. In the case of FIG. 4, a pedal position signal is delivered to controller 44' which includes a pedal position to pedal count transfer function plot and a pedal map, as shown at 32" and 20'''. A wheel torque request is delivered, as shown at 42', to electronic controller 46'. An engine 48' and a motor 50' are under the control of the controller 46'. The engine mechanically drives generator 56. The output of the generator 56 is combined with the power output of the battery 54' to drive the motor 50', which in turn mechanically drives the traction wheels.

Figure 5:
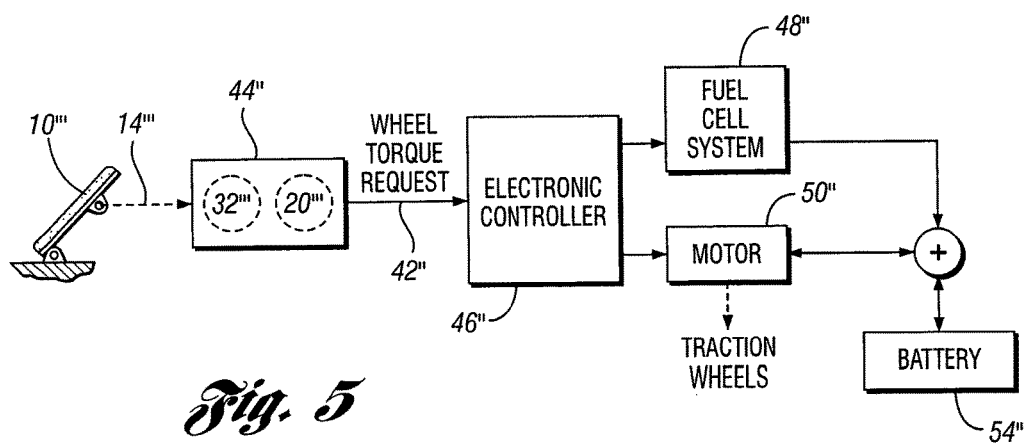
FIG. 5 is a view, similar to FIG. 2, which is adapted for use with a hydrogen fuel cell powertrain.

FIG. 5 shows a fuel cell powertrain in which a fuel cell system rather than an internal combustion engine is used. The overall configuration of the components of the fuel cell powertrain of FIG. 5 is similar to the configuration illustrated in FIG. 4 for the series-hybrid electric vehicle powertrain. Common numerals are used for corresponding components, although prime notations are added to the numerals used in FIG. 4. In the case of the fuel cell hybrid electric vehicle powertrain of FIG. 5, the output of the fuel cell system is combined with the battery power to drive the motor, which in turn mechanically drives the traction wheels. As in the case of FIG. 4, the motor 50" may act as a generator to charge the battery in a regenerative drive mode.

Although an embodiment of the invention has been disclosed, it will be apparent to persons skilled in the art that modifications may be made without departing from the scope of the invention. All such modifications and equivalents thereof are intended to be covered by the following claims.

What is claimed:

1. A method for controlling a vehicle powertrain having a driver-operated vehicle accelerator pedal, comprising:
   selecting a transfer function shaping parameter;
   developing a second pedal position signal using an accelerator pedal position signal and a pedal position to pedal position signal transfer function shaped by the selected shaping parameter; and developing a vehicle wheel torque request based upon a pre-calibrated functional relationship between vehicle speed and vehicle wheel torque for the second pedal position signal.

2. The method set forth in claim 1 wherein developing a vehicle wheel torque request based upon a pre-calibrated functional relationship between vehicle speed and vehicle wheel torque comprises selecting the pre-calibrated functional relationship from multiple vehicle speed and vehicle wheel torque relationships based on the second pedal position signal.

3. A control system for controlling a power plant in a vehicle powertrain having a driver-operated vehicle accelerator pedal for commanding vehicle wheel torque by the vehicle driver, the system comprising:

an accelerator pedal position sensor connected to the accelerator pedal for developing an accelerator position signal;

a power plant controller;

a first control module of the power plant controller being configured with a transfer function for converting accelerator position signals to pedal count electrical voltage pulses;

a second control module of the power plant controller in electrical communication with the first control module;

a vehicle speed sensor for developing a vehicle speed signal;

the second control module being configured with processor memory registers in which there resides an accelerator pedal map of at least one functional relationship between wheel torque and vehicle speed for a given number of pedal count electrical voltage pulses; and a vehicle driver operated selector for selecting one of multiple shaping parameters for the transfer function whereby a wheel torque request following an accelerator pedal position change is modified.

4. The control system set forth in claim 3 wherein the first control module is characterized by a transfer function that is changed by selecting a shaping parameter whereby an increased wheel torque is effected in response to a given change in accelerator pedal position.

5. The control system set forth in claim 4 wherein the driver-operated selector is characterized by a driver-operated switch to select a shaping parameter.

6. The control system set forth in claim 5 wherein the switch is a driver operated sliding switch.

7. The control system set forth in claim 5 wherein the switch is a driver operated discrete switch.

8. The control system set forth in claim 5 wherein the power plant is an internal combustion engine and the power plant controller is an engine controller.

9. The control system set forth in claim 6 wherein the power plant is an internal combustion engine and the power plant controller is an engine controller.

10. The control system set forth in claim 7 wherein the power plant is an internal combustion engine and the power plant controller is an engine controller.

11. The control system set forth in claim 4 wherein the vehicle is a parallel hybrid electric vehicle with an electric motor, and the power plant is an engine, driving power being developed both by the engine and the motor under the control of the power plant controller.

12. The control system set forth in claim 4 wherein the vehicle is a series-hybrid electric vehicle with an electric motor, and the power plant is an engine, driving power being developed by the motor under the control of the power plant controller.

13. The control system set forth in claim 4 wherein the vehicle is a series-hybrid electric vehicle with a motor, the power plant being a fuel cell, driving power being developed by the motor under the control of the power plant controller.

14. A method for controlling a vehicle power plant in a vehicle powertrain having a driver-operated vehicle accelerator pedal whereby vehicle power plant torque can be commanded by the vehicle driver, the method comprising:

developing an accelerator pedal position signal in response to adjusting the accelerator pedal;

selecting a transfer function shaping parameter;

monitoring power plant speed;

developing a second pedal position signal using the accelerator pedal position signal and a pedal position to pedal position signal transfer function shaped by the selected shaping parameter; and developing a vehicle power plant torque request based upon a pre-calibrated functional relationship between power plant speed and power plant torque for a given second pedal position signal.

15. The method set forth in claim 14 wherein developing a vehicle power plant torque request based upon a pre-calibrated functional relationship between power plant speed and power plant torque comprises selecting the pre-calibrated functional relationship from multiple power plant speed and vehicle power plant torque relationships based on the second pedal position signal.

16. A control system for controlling a power plant in a vehicle powertrain having a driver-operated vehicle accelerator pedal for commanding vehicle power plant torque by the vehicle driver, the system comprising:

an accelerator pedal position sensor connected to the accelerator pedal for developing an accelerator position signal;

a power plant controller;

a first control module of the power plant controller being configured with a transfer function for converting accelerator position signals to pedal count electrical voltage pulses;

a second control module of the power plant controller in electrical communication with the first control module;

a vehicle power plant speed sensor for developing a power plant speed signal;

the second control module being configured with processor memory registers in which there resides an accelerator pedal map of at least one functional relationship between power plant torque and vehicle power plant speed for a given number of pedal count electrical voltage pulses; and a vehicle driver operated selector for selecting one of multiple shaping parameters for the transfer function whereby a power plant torque request following an accelerator pedal position change is modified.

17. The control system set forth in claim 16 wherein the first control module is characterized by a transfer function that is changed by selecting a shaping parameter whereby an increased power plant torque is effected in response to a given change in accelerator pedal position.

* * * * *